United States Patent
Hsu et al.

(10) Patent No.: US 8,754,987 B2
(45) Date of Patent: Jun. 17, 2014

(54) METHOD FOR CONTROLLING DISPLAY

(71) Applicant: AmTRAN Technology Co., Ltd, New Taipei (TW)

(72) Inventors: Ching-Chang Hsu, New Taipei (TW); Wen-Kang Wei, New Taipei (TW); Yung-Hung Ho, New Taipei (TW); Chien-Yu Hsiung, New Taipei (TW)

(73) Assignee: AmTRAN Technology Co., Ltd., Jhonghe District, New Taipei (TW)

( * ) Notice: Subject to any disclaimer, the term of this patent is extended or adjusted under 35 U.S.C. 154(b) by 0 days.

(21) Appl. No.: 13/849,534

(22) Filed: Mar. 24, 2013

(65) Prior Publication Data

US 2014/0098294 A1    Apr. 10, 2014

(30) Foreign Application Priority Data

Oct. 8, 2012 (TW) .............................. 101137098 A (51) Int. Cl.
*H04N 5/50* (2006.01)

(52) U.S. Cl.
USPC ........... 348/569; 348/734; 348/731; 348/732; 348/725; 348/565; 348/563; 348/564; 348/566; 348/570; 725/39; 725/40; 725/133; 725/141; 340/12.22; 340/4.3

(58) Field of Classification Search
USPC ......... 348/569, 734, 731, 732, 565, 563, 564, 348/566, 570; 725/39, 40, 133, 141; 340/12.22, 4.3

See application file for complete search history.

(56) References Cited

U.S. PATENT DOCUMENTS

| | | | |
|---|---|---|---|
| 7,810,129 B2 * | 10/2010 | Yamada et al. ................ | 725/133 |
| 8,587,524 B2 * | 11/2013 | Hsieh et al. ..................... | 345/169 |
| 2005/0246743 A1 * | 11/2005 | Takagi et al. ................... | 725/72 |
| 2008/0168504 A1 * | 7/2008 | Yamada et al. ................... | 725/58 |
| 2011/0126231 A1 * | 5/2011 | Ko .................................. | 725/39 |
| 2011/0138416 A1 * | 6/2011 | Kang et al. ....................... | 725/39 |
| 2012/0044044 A1 * | 2/2012 | Hsieh et al. ..................... | 340/4.3 |
| 2012/0044135 A1 * | 2/2012 | Hsieh et al. .................... | 345/156 |
| 2012/0154129 A1 * | 6/2012 | Hsieh et al. ................. | 340/12.22 |
| 2012/0162536 A1 * | 6/2012 | Sibilsky et al. ................ | 348/734 |
| 2013/0050518 A1 * | 2/2013 | Takemura et al. ........ | 348/211.99 |

* cited by examiner

*Primary Examiner* — Jefferey Harold
*Assistant Examiner* — Mustafizur Rahman
(74) *Attorney, Agent, or Firm* — Winston Hsu; Scott Margo (57) ABSTRACT

A display device includes a display component coupled to a signal generating unit with a single trace. The signal generating unit generates a first signal. A processing unit, connected to the display component and the single trace, receives the first signal through the single trace and generates a first type control signal, a second type control signal, and a third type control signal according to the first signal. The processing unit generates and controls an on-screen display menu displayed by the display component according to status of the display device and the received first signal as one of the first type control signal, the second type control signal, and the third type control signal.

20 Claims, 3 Drawing Sheets

METHOD FOR CONTROLLING DISPLAY

BACKGROUND OF THE INVENTION

1. Field of the Invention

The present invention relates to a method for controlling a display device, especially a method of controlling the display device by pressing a single button of the display device.

2. Description of the Prior Art

The flat-screen TVs, such as LCD TVs, are controlled by remote control devices generally. In addition, the flat-screen TVs are configured to include multiple buttons on the case of the flat-screen TV. In case the user could not find the remote control devices or the batteries of the remote control devices are empty, the user still can control the flat-screen TV with bare hand. Usually, there are six or more buttons on the case of a related art flat-screen TV, including power button, buttons for switching the channel and the volume up or down, and the button for showing and controlling an on-screen display. Since these buttons are disposed on the case of the flat-screen TV, a significant part of the flat-screen TV's surface will be occupied by the buttons, and inner circuits are required for all the buttons. Thus, the overall design of the flat-screen TV becomes more complicated and the cost of manufacturing the flat-screen TV is raised.

SUMMARY OF THE INVENTION

An embodiment of the present invention relates to a display device comprising a display component, a signal generating unit, and a processing unit. The signal generating unit is coupled to the display component with a single trace and generates a first signal. The processing unit is connected to the display component and the single trace. The processing unit receives the first signal from the signal generating unit through the single trace and generates a first type control signal, a second type control signal and a third type control signal according to the first signal. The processing unit generates an on-screen display menu to be displayed by the display component. The processing unit controls the on-screen display menu according to status of the display device and the received first signal as one of the first type control signal, the second type control signal and the third type control signal.

Another embodiment of the present invention relates to an electronic device, comprising a display component, a signal generating unit and a processing unit. The signal generating unit is coupled with a single trace and operated by a user to generate a first signal. The processing unit is connected to the display component and connected to the single trace to receive the first signal from the signal generating unit. The processing unit generates a first type control signal, a second type control signal and a third type control signal according to the first signal. The processing unit generates an on-screen display menu to be displayed by the display component. The on-screen display menu comprises at least an option for switching input source, an option for switching channel, and an option for switching sound volume. The processing unit controls the on-screen display menu according to status of the electronic device and the received first signal as one of the first type control signal, the second type control signal and the third type control signal.

Another embodiment of the present invention relates to a method of controlling an electronic device. The electronic device has a single signal generating unit capable of being operated by a user to generate a single signal. The method comprises receiving the single signal, generating a first type control signal if the single signal appears once in a first time period and lasts shorter than a second time period, generating a second type control signal if the single signal appears once in the first time period and lasts longer than the second time period, generating a third type control signal if the single signal appears twice in the first time period, generating an on-screen display menu, and controlling the on-screen display menu according to status of the electronic device and the received single signal as one of the first type control signal, the second type control signal and the third type control signal.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referred to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "electrically coupled" can be referred to either directly connecting or indirectly connecting between elements.

The embodiments and figures are provided as follows in order to illustrate the present invention in detail, but please notice that the claimed scope of the present invention is not limited by the provided embodiments and figures.

Figure 1:
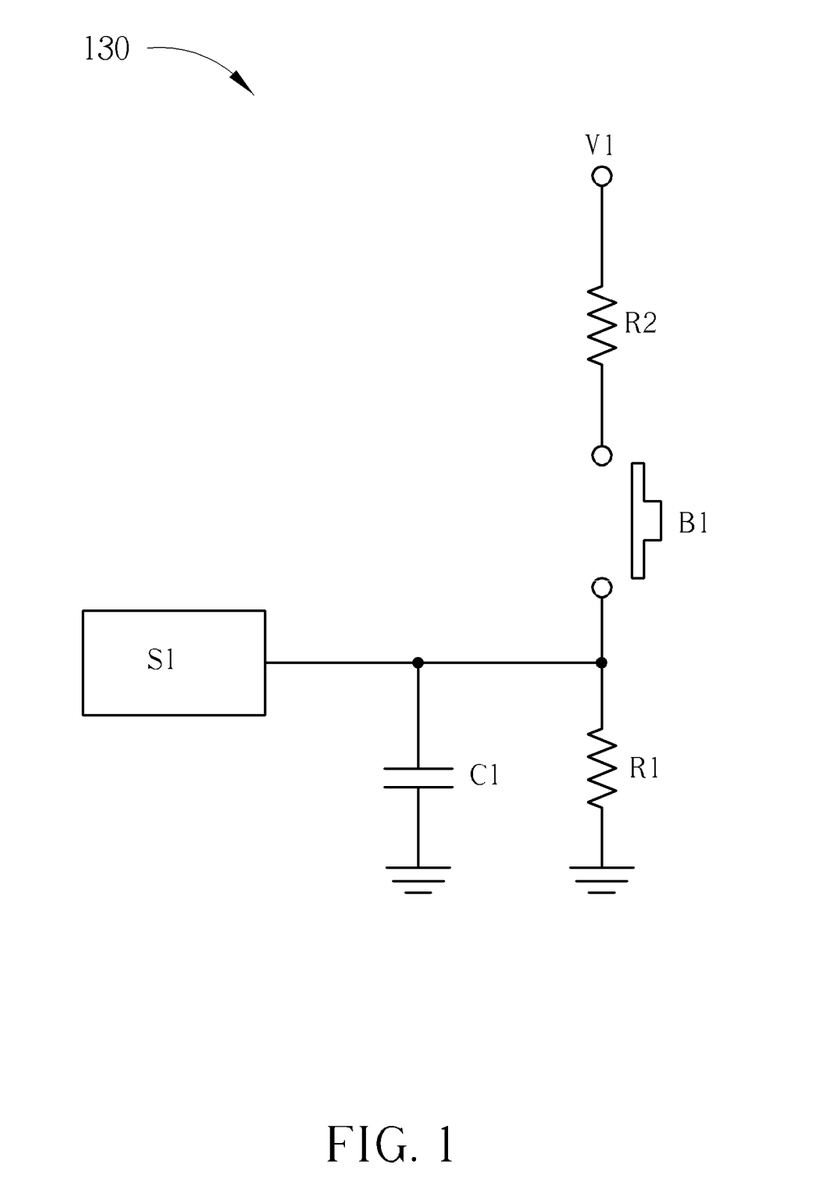
FIG. 1 shows an inner circuitry of a display device of the present invention.

Please refer to FIG. 1, which shows an inner circuitry 130 of a display device of the present invention. As shown in FIG. 1, the inner circuitry 130 comprises a processor S1, a capacitor C1 and resistors R1 and R2. The first end of the capacitor C1 is coupled to the processor S1, and the second end of the capacitor C1 is coupled to the ground end. The first end of the resistor R1 is coupled to the processor S1, and the second end of the resistor R1 is coupled to the ground end. The first end of the resistor R2 is coupled to the voltage source V1. The first end of the button B1 is coupled to the second end of the resistor R2, and the second end of the button B1 is coupled to the processor S1. When the button B1 is not pressed, the circuit is open at the button B1, and the potential at the first end of the resistor R1 is pulled low due to the resistor R1 is grounded. Thus, the processor S1 will detect a low potential. When the button B1 is pressed, the circuit is on at button B1, and the potential at the first end of the resistor R1 will be pulled as high as $V1 \times R1/(R1+R2)$ by the voltage V1, so that the processor S1 will detect a high potential. Thus, based on the potential detected by the processor, the durations of the detected fixed potentials and the durations between the high and low potentials, various commands for controlling the display device can be generated accordingly.

For example, a finite state machine (FSM) can be implemented in the firmware of the processor S1, for switching the states of the On-Screen Display (OSD) Menu according to commands resulting from the potentials detected by the processor S1. If the button B1 is only pressed once and the detected duration of the button B1 being pressed is shorter than a predetermined time period, the processor S1 will take the press on Button B1 as a "one click", which is the first type pressing command. If the detected duration of the button B1 being pressed is longer than the predetermined time period, the processor S1 will take the press on button B1 as a "long press", which is the second type pressing command. And if the button B1 is pressed twice in a predetermined time period and the interval between the two presses is not longer than a threshold, the processor S1 will take the presses on the button B1 as a "double click", which is the third type pressing command.

Figure 2:
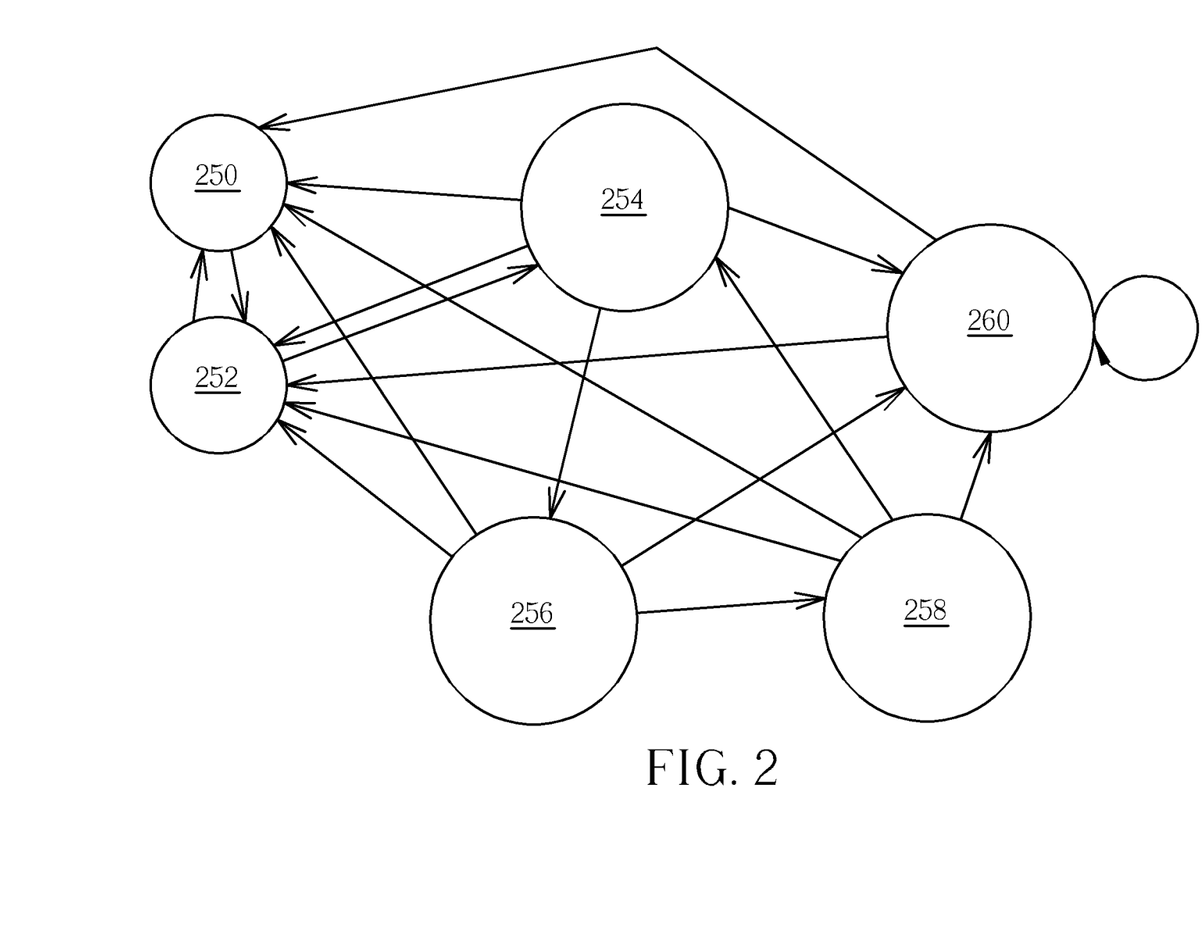
FIG. 2 shows a finite state machine for controlling the display device according to an embodiment of the present invention.
Figure 3:
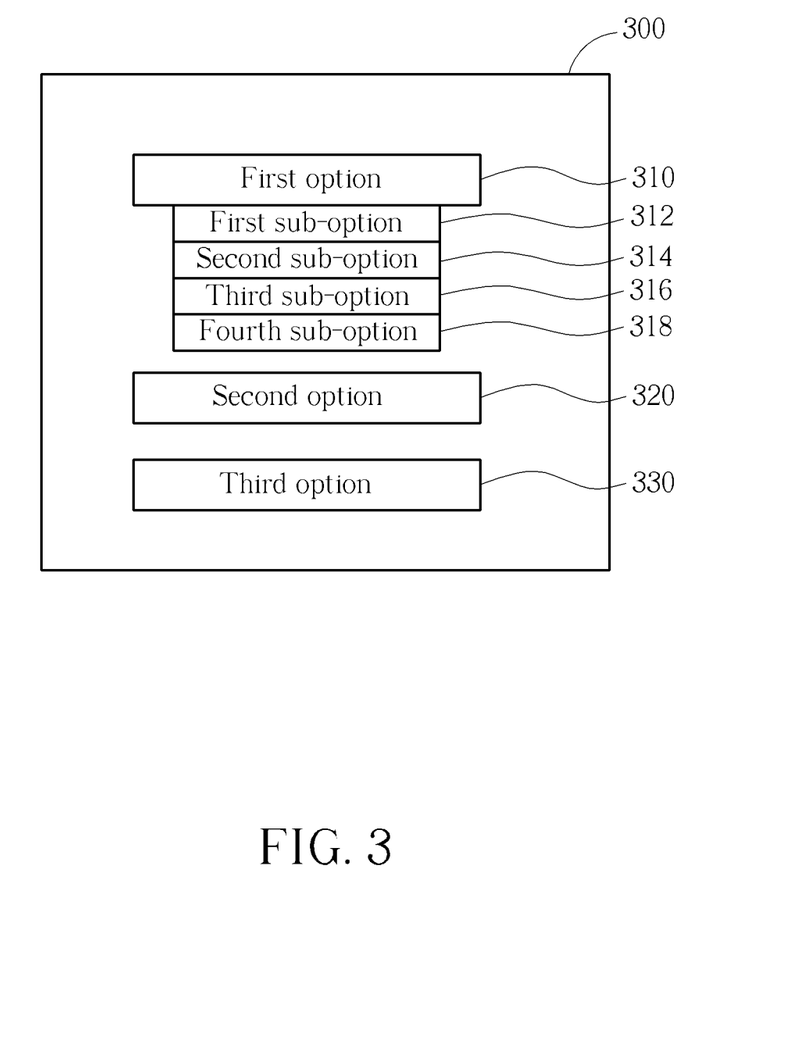
FIG. 3 shows a user menu.

Please refer to FIGS. 2 and 3 and the above defined pressing commands. FIG. 2 shows a finite state machine for controlling the display device according to an embodiment of the present invention. FIG. 3 shows an OSD menu 300. States 250 to 260 in FIG. 2 are described as follows:

State 250: the display device is in standby state;

State 252: the display device is turned on but does not display the OSD menu 300;

State 254: the display device is turned on and displays the OSD menu 300, and the first option 310 of the OSD menu 300 is targeted;

State 256: the display device is turned on and displays the OSD MENU 300, and the second option 320 of the OSD MENU 300 is targeted;

State 258: the display device is turned on and displays the OSD MENU 300, and the third option 330 of the OSD MENU 300 is targeted;

State 260: the targeted option is unfolded, and the sub-option next to the current sub-option under the unfolded option is targeted; if the last sub-option under the unfolded option was targeted or the targeted option was unfolded, unfolding the targeted option and targeting the first sub-option under the unfolded option.

According to an embodiment of the present invention, when the display device is in state 250, the user can press the button B1 with any type pressing command to turn on the display device, which switches the display device from the state 250 to the state 252. And when the display device is turned on, the display device will be switched from the state 252 to the state 254 if the button B1 is pressed with "one click", the first type press, which makes the display device show the OSD MENU 300 and a cursor automatically targeting the first option 310 of the OSD MENU 300. After that, if the button B1 is further pressed with the first type press, the display device will be switched from the state 254 to the state 260, which makes the first option 310 being selected and unfolded and the first sub-option 312 under the first option 310 being targeted. When the display device enters into the state 260, the display device will show the sub-menu of the currently targeted option unfolded, e.g. the sub-menu of the first option 310, and the sub-option next to the current sub-option in the sub-menu being targeted. If the last sub-option 318 in the sub-menu was targeted or the sub-menu of the targeted option was not unfolded, the state 260 makes the first sub-option 312 in the sub-menu be targeted. If the display device is at the state 260 and the button B1 is pressed with the first type press, the currently targeted sub-option will be selected and the function corresponding to the currently targeted sub-option will be executed. If the display device is in state 260 and the first sub-option 312 has been targeted, when the button B1 is pressed with the third type press, the system of the display device will remain at the state 260 and the cursor will sequentially target the sub-option next to the current sub-option in the sub-menu. In this way, when the last sub-option of the first option 310, e.g. the fourth sub-option 318 in FIG. 1 is targeted, if the button B1 is pressed with the third type press, the cursor will target the first sub-option 312 in the sub-menu of the first option 310. However, the present invention is not limited as this embodiment. The FSM of the display device of the present invention can configure the first option 310 to return to the folded state 254, instead of remaining in unfolded and targeting the first sub-option 312, when display device is in state 260 and the button B1 is further pressed with the third type press. As mentioned above, the user can sequentially switch between the sub-options and then execute a desired sub-option with the first type press.

In addition, when the FSM is at the state 254 and the first option is targeted, the third type press on the button B1 will result in the FSM entering into the state 256 from the state 254 and the cursor targeting the second option 320 of the OSD MENU 300. At this time, if the button B1 is further pressed with the third type press, the FSM will enter into the state 258 from the state 256 and the cursor will target the third option 330 of the OSD MENU 300, and so on. When the last option of all the options in the OSD MENU 300, for example, the option 330 of the options 310-330, is targeted and the button B1 is pressed with the third type press, the FSM will return to the state 254 and the cursor will target the first option 310 again. In an embodiment of the present invention, the second option 320 and the third option 330 also comprise sub-options. When the second option 320 or the third option 330 is targeted, namely the FSM is at the state 256 or 258, the first type press on the button will result in the FSM being switched to the state 260, unfolding the sub-menu of the second option 320 or the third option 330 and targeting the first sub-option thereof. The method of switching and executing the sub-options under the second option 320 or the third option 330 can be referred to the descriptions about the first option 310 mentioned above, and will not be further described. In another embodiment of the present invention, the second option 320 and the third option 330 does not comprise any sub-option. In this case, when the FSM is at the state 256 or 258, a first type press will result in the second option 320 or the third option 330 being selected and executed. For example, the second option 320 or the third option 330 may be the options to switch channels or volume sequentially. When the channel or volume switching option is executed, if the display device receives a first type press on the button, the display device will sequentially switch to the next channel or volume level and display the corresponding channel number or volume value. If the display device further receives a switch command when the display device is at the last channel or volume level, the display device will return to the first channel or the volume level. Thus, the user can switch to the desired channel or volume through pressing the single button accordingly.

In the present invention, the manufacturer of the display device can design the OSD MENU 300 in various ways according to the user demands. For instance, in the FIG. 3, the OSD MENU 300 comprises the first option 310, the second option 320 and the third option 330, and the options 310-330 may comprise a plurality of sub-options. However, the present invention does not limit the number of the options and the number of the sub-options in the OSD MENU 300. Furthermore, the way of targeting an option or a sub-option can be a cursor targeting the option or the sub-option, marking the option or the sub-option with a frame, high-lighting the option or the sub-option, or any other ways as long as the option or the sub-option can be noted in order to inform the user which option or sub-option is currently selected. In an embodiment of the present invention, the first option 310 can be an option for switching the audio/video (A/V) input source, and comprises the first sub-option 312 to the fourth sub-option 318 respectively representing available input sources of the display device. When the first option 310 is targeted and the button B1 is pressed with the first type press, the display device will switch current input source to the input sources corresponding to the first sub-option 312 to the fourth sub-option 318 sequentially, so the display device can display the video received from the selected input source. In an embodiment of the present invention, the options or sub-options may include options for turning the volume up, turning the volume down, switching the channel up, switching the channel down or turning off the power. However the present invention does not limit the structure, shape and the contents of the OSD MENU 300. The method for operating the OSD MENU 300 is previously described, and will not be further described. Moreover, the language used in the OSD MENU 300 could be English, Traditional Chinese, Simplified Chinese, Japanese, Korean, German and so on.

According to the present invention, when the user wants to watch image or video displayed by the display device, the user should firstly press the button B1 in order to turn on the display device. If the user further presses the button with the first type press, the OSD MENU 300 will be shown by the display device. When the OSD MENU 300 is generated on the screen, the first option 310 is targeted by the cursor. If the user presses the button with the first type press at this moment, the display device will execute the first option 310 or unfold the sub-menu of the first option 310. The sub-menu comprises the sub-options, for example, including the first sub-option 312 to the fourth sub-option 318. If the sub-menu is unfolded, the first sub-option 312 will be firstly targeted. If the user presses the button with the first type press, the first sub-option 312 will be executed. Besides, when the display device is at the state 252, 254, 256, 258 and 260, if the button is long pressed or receives the second type press, the display device will be turned off and return to the state 250. Furthermore, the display device can be configured that if the OSD MENU 300 is not operated for a predetermined time period, the OSD MENU 300 will be automatically closed. The predetermined time period can be 2 second and adjusted as demands.

According to the present invention, the operating commands are generated by the first, second and third type presses, and can be exchanged with one another. In this way, various methods for controlling the display device can be designed according to the present invention. In addition, the first processor implementing the FSM of the present invention can be configured to define more press types. Any changes and modifications to the methods utilizing different press types or other ways to trigger the single button on the display device in order to operate a display device can be derived from the present invention. For example, the first, second and third type press can be replaced by other ways to trigger different signals, and the modifications to the contents and/or interface of the OSD menu can be derived from the present invention. Moreover, the OSD MENU 300 may further comprise various options and various visual designs of the user interface, and OSD menu could comprise the any combination of the options and visual designs of the user interface.

Please refer to TABLE 1, which is a table showing the events of a television corresponding to FSM and press types on the single button according to the present invention. In TABLE 1, the press types are represented as "First", "Second", "Third", and "Zero", wherein "Zero" represents that the button is not being pressed over a predetermined time period, e.g. 2 second.

TABLE 1

| Event Number | Current Status | Press Type | Next Status |
|---|---|---|---|
| 1 | TV is turned off | First | TV is turned on |
| 2 | TV is turned on and not displaying the OSD menu | First | TV displays the OSD menu and the option for switching input source is targeted in the OSD menu |
| 3 | TV displays the OSD menu and the option for switching input source is targeted in the OSD menu | Third | TV displays the OSD menu and the option for switching current channel is targeted in the OSD menu |
| 4 | TV displays the OSD menu and the option for switching current channel is targeted in the OSD menu | Third | TV displays the OSD menu and the option for switching current volume level is targeted in the OSD menu |
| 5 | TV displays the OSD menu and the option for switching current volume level is targeted in the OSD menu | Third | TV displays the OSD menu and the option for switching input source is targeted in the OSD menu |
| 6 | TV displays the OSD menu and the option for switching input source is targeted in the OSD menu | First | TV executes the option for switching input source. |
| 7 | TV displays the OSD menu and the option for switching current channel is targeted in the OSD menu | First | TV executes the option for switching current channel. |
| 8 | TV displays the OSD menu and the option for switching current volume level is targeted in the OSD menu | First | TV executes the option for switching current volume level |
| 9 | TV displays the OSD menu | Zero | TV executes the option targeted currently and hides the OSD menu |
| 10 | TV is turned on | Second | TV is turned off |

In TABLE 1, the definitions of the first, second and third press types are previously described, and the corresponding operations can be derived from the aforementioned embodiments. Each event in TABLE 1 is described as follows.

When the TV is turned off, pressing the button with the first type press will trigger the Event 1, and the TV will enter power-on state. When the TV is turned on and the OSD is not shown, pressing the button with the second type press will trigger the Event 2, and the TV will show the OSD menu and target the option of selecting input sources. When the targeted option is selecting input source, pressing the button with the third type press will trigger the Event 3, and the option for switching current channel in the OSD menu will be targeted. When the option for switching current channel is targeted, pressing the button with the third type press will trigger the Event 4, and the option for switching current volume level in the OSD menu will be targeted. When the option for switching current volume level is targeted, pressing the button with the third type press will trigger Event 5, and the option for switching input source in the OSD menu will be targeted. When the option for switching input source is targeted, pressing the button with the first type press will trigger Event 6, and the TV will execute the function for switching input source. For example, when the option for switching input source is executed, all selectable input sources of the TV will be shown in the OSD menu, as the sub-options depicted in FIG. 3. The sub-option 312 to 318 are further displayed under the first option 310, and the sub-option corresponding to the currently used input source, not always the first sub-option, is targeted initially. Another difference between the operations of TABLE 1 and the embodiment of FIG. 2 is that, in the operations of TABLE 1, the targeted input source can be sequentially switched by first type press, and the third type press is utilized to select the currently targeted input source as current input source of the TV. In addition, if the button of the TV is not operated over a predetermined time period, e.g., 2 second, the command of type "zero" will be generated automatically to select the currently targeted input source as current input source of the TV, and then close the OSD menu.

When the option for switching current channel is targeted, pressing the button with the first type press will trigger Event 7, and the TV will execute the function for switching current channel. For example, when the Event 7 is triggered, the TV will firstly display 10 channels nearest to the current channel in the OSD region. The first type press can sequentially switch the targeted channel, and the third type press can select the currently targeted channel as current channel of the TV. Also, if the button of the TV is not operated over a predetermined time period during channel switching, the TV will also select the currently targeted channel as current channel and close the OSD menu. Furthermore, the order to switch channels or the order to display channels can be forward or backward, such as from Channel 1 to Channel 100 or from Channel 100 to Channel 1. When the targeted channel is switched to next channel, the displayed multiple nearest channels will be updated accordingly for the user's reference. If the last channel in the displayed multiple nearest channels is exactly the last channel of the TV, e.g. Channel 100 of 100 channels, and the user switches to target next channel, the displayed multiple nearest channels will be updated to display the first channel of the TV, e.g. Channel 1, following the last channel. Please notice that the above illustration does not limit the channels numbers of the TV in the present invention.

When the option for switching current volume level is targeted, pressing the button with the first type press will trigger Event 8, and the TV will execute the function of switching volume level. For example, the TV can be configured to display 11 levels of volume, such as: 0(mute), 10(1-10), 20(11-20), 30(21-30), 40(31-40), 50(41-50), 60(51-60), 70(61-70), 80(71-80), 90(81-90), 100(91-100) and so on. Except that the level 0 represents mute, each other level comprises 10 volume values. The first type press can sequentially switch the targeted volume level among the 11 levels. If the button of the TV is not operated over a predetermined time period during volume level switching, the TV will also select the currently targeted volume level as current volume level and close the OSD menu. Also, the third type press will make the TV immediately select the currently targeted volume level without pending a predetermined time period. When the TV receives the command of selecting a specific volume level as current volume level, the TV can directly adjust the volume to a specific volume value in the selected volume level, e.g. the first, last or the middle volume value in the volume level, or the OSD can further unfold another set of sub-options for the user to select a specific volume value in the volume level. Further, the order to display or switch volume levels or volume values can be forward or backward. When the last volume level is targeted, the TV will then target the first volume level if the TV receives the command to switch the volume level again. Moreover, when the last volume value in a volume level is targeted, the TV will then target the first volume value or be mute if TV receives the command to switch the volume value again.

When the OSD is shown, if the button of the TV is not operated over a predetermined time period, Event 9 will be triggered and the TV will close the OSD menu, and execute the function of a sub-option if the sub-option is targeted. In any status, if the button of the TV is pressed with the second type press, Event 10 will be triggered and the TV enters standby mode.

Please refer to TABLE 2, which is another table showing the events of a television corresponding to FSM and press types on the single button according to the present invention.

TABLE 2

| Event Number | Current Status | Press Type | Next Status |
|---|---|---|---|
| 1 | TV is turned off | First | TV is turned on |
| 2 | TV is turned on and not displaying the OSD menu | First | TV displays the OSD menu and the option for switching input source is targeted in the OSD menu |
| 3 | TV displays the OSD menu and the option for switching input source is targeted in the OSD menu | Third | TV displays the OSD menu and the option of volume up is targeted in the OSD menu |
| 4 | TV displays the OSD menu and the option of volume up is targeted in the OSD menu | Third | TV displays the OSD menu and the option of volume down is targeted in the OSD menu |
| 5 | TV displays the OSD menu and the option of volume down is targeted in the OSD menu | Third | TV displays the OSD menu and the option of channel up is targeted in the OSD menu |
| 6 | TV displays the OSD menu and the option of channel up is targeted in the OSD menu | Third | TV displays the OSD menu and the option of channel down is targeted in the OSD menu |
| 7 | TV displays the OSD menu and the option of channel down is targeted in the OSD menu | Third | TV displays the OSD menu and the option of turning off is targeted in the OSD menu |
| 8 | TV displays the OSD menu and the option of turning off is targeted in the OSD menu | Third | TV displays the OSD menu and the option for switching input source is targeted in the OSD menu |
| 9 | TV displays the OSD menu and the option for switching input source is targeted in the OSD menu | First | TV displays a sub-menu listing available input sources. |
| 10 | TV displays the OSD menu and the option of volume up is targeted in the OSD menu | First | TV increases sound volume. |
| 11 | TV displays the OSD menu and the option of volume down is targeted in the OSD menu | First | TV decreases sound volume. |
| 12 | TV displays the OSD menu and the option of channel up is targeted in the OSD menu | First | TV switches to the channel next to the current channel |
| 13 | TV displays the OSD menu and the option | First | TV switches to the last channel of the |

TABLE 2-continued

| Event Number | Current Status | Press Type | Next Status |
|---|---|---|---|
| | of channel down is targeted in the OSD menu | | current channel |
| 14 | TV displays the OSD menu and the option of turning off is targeted in the OSD menu | First | TV is turned off |
| 15 | TV is turned on and not displaying the OSD menu | Second | TV is turned off |
| 16 | TV displays the OSD menu | Second | TV continuously switching the targeted option until the button is released. |
| 17 | TV displays the OSD menu | Zero | TV closes the OSD menu |

In TABLE 2, the definitions of the first, second and third press types are previously described, and the corresponding operations can be derived from the aforementioned embodiments. Each event is described as follows.

When the TV is turned off, pressing the button with the first type press will trigger the Event 1, and the TV will enter into standby state. When the TV is turned on and the OSD menu is not shown, pressing the button with the second type press will trigger the Event 2, and the TV will show the OSD menu and a cursor targeting the option for switching input source. When the option for switching input source is targeted, pressing the button with the third type press will trigger the Event 3, and the option of volume up will be targeted. When the option of volume up is targeted, pressing the button with the third type press will trigger the Event 4, and the option of volume down will be targeted. When the option of volume down is targeted, pressing the button with the third type press will trigger Event 5, and the option of channel up will be targeted. When the option of channel up is targeted, pressing the button with the third type press will trigger Event 6, and the option of channel down will be targeted. When the option of channel down is targeted, pressing the button with the third type press will trigger Event 7, and the option of turning off the TV will be targeted. When the option of turning off the TV is targeted, pressing the button with the third type press will trigger Event 8, and the TV will anew target the option of switching input source in the OSD menu.

When the option of switching input source is targeted, pressing the button with the first type press will trigger Event 9, and the TV will execute the function of switching input source. For example, when the option of switching input source is executed, all the selectable input sources of the TV will be displayed as sub-options in the OSD menu, and the current input source of the TV will be targeted. In addition, the embodiment is different from the embodiment of FIG. 2, wherein the user can press the button with the second type press (long press) to switch the targeted input source among the selectable input sources displayed as sub-options. During the long press, the TV will continuously switch the targeted input source until the user releases the button. After the button is released and the TV does not receive any signal from the button over 2 seconds, the TV will select the last targeted input source as the input source of the TV. Then the TV will display video received from the selected input source and close the OSD menu. When the option of volume up is targeted, pressing the button with the first type press will trigger Event 10, and the volume of the speaker controlled by the TV will be increased. When the option of volume down is targeted, pressing the button with the first type press will trigger Event 11, and the volume of the speaker controlled by the TV will be decreased. When the option of channel up is targeted, pressing the button with the first type press will trigger Event 12, and the TV will switch to the channel next to the current channel. When the option of channel down is targeted, pressing the button with the first type press will trigger Event 13, and the TV will switch to the last channel of the current channel.

When the option of turning off the TV is targeted, pressing the button with the first type press will trigger Event 14 and the TV will be shut down or enter standby mode. When the TV is turned on and does not display the OSD menu, pressing the button with the second type press will trigger Event 15, and the TV will be shut down or enter standby mode. When the TV is turned on and the OSD menu is shown, pressing the button with the second type press will trigger Event 16, where the TV will continuously switch the targeted option in the OSD menu until the user releases the button. Then the user can release the button when a desired option is currently targeted, and press the button with the first type press to trigger Events 9 to 14 in order to execute the function of the desired option. When the TV is turned on and the OSD menu is shown, if the button is not pressed over a predetermined time period, Event 17 will be triggered and the OSD menu will be closed.

Please notice that the applications of TABLEs 1 and 2 are derivations of the present invention and are not used to limit the claimed scope of the present invention. In TABLEs 1 and 2, the order of the options in the OSD menu can be changed. For example, the preset targeted option can be channel switching options or volume changing options when the OSD menu is displayed. And the layout of the user interface in the embodiment of TABLE 1 can be modified as those in TABLE 2. For example, the option for switching channel in TABLE 1 can be replaced with the options of channel up/channel down in TABLE 2. The OSD menu 300 in FIG. 1 can provide both the channel up and channel down options, or provide one of them only. Similarly, the option for switching volume level in TABLE 1 can be also modified as TABLE 2 in the above manner.

Moreover, the layout of the OSD menu is not limited by the embodiments of TABLES 1 and 2. For example, the option of switching input source may provide a list of all available input sources for selection, or provide only part of the input sources instead of available input sources, for example, the current targeted input source or the current targeted input source and the next input source to be targeted. When the targeted input source is changed, the TV can switch the input source as the targeted input source immediately, or switch the input source only when the TV is triggered to switch input source as the targeted input source. When the user switches the channel of the display device, the display device can display all the channel in the channel list, part of the channels, e.g. 10 channels, or the current channel only. The OSD menu can provide one directional (forward or backward) switching functions, or provide both of them. Similarly, the option for switching volume level in TABLE 1 can be also modified in the above manner.

Besides, the present invention can be applied in display devices other than TVs, wherein the OSD menu of the display device does not have options for switching input source, channel, and/or volume level. The present invention only requires the user interface of the display device can be controlled by utilizing different ways to press a single button. In addition, the signal generated device of the present invention is not limited to button only, which can be any single device or structure generating signals resulted from the user's operations, where the signals can be transmitted through a single trace in the inner circuit of the display device and become different commands.

In view of, by applying the present invention, the display device having the single button can be operated to perform various functions without other control device. Therefore, the user can control the display device as usual even if he cannot find the remote control of the display device. Furthermore, since the display device only has a single button, the surface area occupied by control button is less than the prior art, and the number of the inner traces in the inner circuit can be reduced. Thus, the complexity of designing the case structure and the inner circuit of the display device can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
   a display component;
   a signal generating unit, coupled to the display component with a single trace, generating a first signal; and
   a processing unit connected to the display component and the single trace, the processing unit receiving the first signal from the signal generating unit through the single trace and generating a first type control signal, a second type control signal and a third type control signal according to the first signal;
   wherein the processing unit generates an on-screen display menu to be displayed by the display component, and the processing unit controls the on-screen display menu according to status of the display device and the received first signal as one of the first type control signal, the second type control signal and the third type control signal.

2. The display device of claim 1, wherein when the display device is turned on and the processing unit generates the first type control signal based on the first signal, the display component displays the on-screen display menu comprising a plurality of options, and when the display component displays the on-screen display menu and the processing unit generates the first type control signal, the display selects one of the plurality of options.

3. The display device of claim 1, wherein when the display device is turned on and the processing unit generates the second type control signal, the display device enters into standby state.

4. The display device of claim 1, wherein the processing unit generates the first type control signal, the second type control signal and the third type control signal according to a length of time or frequency of the first signal.

5. The display device of claim 1, further comprising:
   a plurality of input ports for receiving video to be displayed by the display component;
   wherein the on-screen display menu comprises at least an option for switching input source, an option for switching channel, and an option for switching sound volume, and the option for switching input source switches an input source of the display device to be one of the input ports.

6. The display device of claim 1, wherein the display component hides the on-screen display menu if the first type control signal, the second type control signal or the third type control signal is not generated over a first time period when the on-screen display menu is displayed by the display component.

7. The display device of claim 4, wherein the processing unit generates the first type control signal if the first signal appears once in a second time period and lasts shorter than a third time period, generates the second type control signal if the first signal appears once in the second time period and lasts longer than the third time period, and generates a third type control signal if the first signal appears twice in the second time period.

8. An electronic device, comprising:
   a display component;
   a signal generating unit, coupled with a single trace, being operated by a user to generate a first signal; and
   a processing unit connected to the display component, and connected to the single trace to receive the first signal from the signal generating unit, the processing unit generating a first type control signal, a second type control signal and a third type control signal according to the first signal;
   wherein the processing unit generates an on-screen display menu to be displayed by the display component, the on-screen display menu includes at least an option for switching input source, an option for switching channel, and an option for switching sound volume, and the processing unit controls the on-screen display menu according to status of the electronic device and the received first signal as one of the first type control signal, the second type control signal and the third type control signal.

9. The electronic device of claim 8, wherein the processing unit generates the first type control signal, the second type control signal and the third type control signal according to a length of time or frequency of the first signal.

10. The electronic device of claim 9, wherein the processing unit generates the first type control signal if the first signal appears once in a second time period and lasts shorter than a third time period, generates the second type control signal if the first signal appears once in the second time period and lasts longer than the third time period, and generates a third type control signal if the first signal appears twice in the second time period.

11. The electronic device of claim 8, further comprising:
    a plurality of input ports receiving video to be displayed by the display component;
    wherein the option for switching input source switches input source of the electronic device as one of the input ports.

12. The electronic device of claim 8, wherein when the electronic device is turned on and the processing unit generates the first type control signal based on the first signal, the display component displays the on-screen display menu comprising a plurality of options, and when the display component displays the on-screen display menu and the processing unit generates the first type control signal, the electronic device selects one of the plurality of options.

13. The electronic device of claim 8, wherein when the electronic device is turned on and the processing unit generates the second type control signal, the electronic device enters into standby state.

14. The electronic device of claim 8, wherein the display component hides the on-screen display menu if the first type control signal, the second type control signal or the third type control signal is not generated over a first time period when the on-screen display menu is displayed by the display component.

15. A method of controlling an electronic device, the electronic device having a single signal generating unit capable of being operated by a user to generate a single signal, the method comprising:

receiving the single signal;
generating a first type control signal if the single signal appears once in a first time period and lasts shorter than a second time period;
generating a second type control signal if the single signal appears once in the first time period and lasts longer than the second time period;
generating a third type control signal if the single signal appears twice in the first time period;
generating an on-screen display menu; and
controlling the on-screen display menu according to status of the electronic device and the received single signal as one of the first type control signal, the second type control signal and the third type control signal.

16. The method of claim 15, wherein the on-screen display menu comprises a plurality of options, and the method further comprises:

selecting one of the options when the electronic device displays the on-screen display menu and the first type control signal is generated from the received single signal.

17. The method of claim 15, wherein the electronic device comprises a plurality of input ports, the on-screen display menu comprises a plurality of options, and one of the options is for switching an input source of the electronic device as one of the input ports.

18. The method of claim 15, further comprising:

displaying the on-screen display menu if the first type control signal is generated when the electronic device is turned on and the on-screen display menu is not displayed.

19. The method of claim 16, further comprising:

hiding the on-screen display menu if the first type control signal, the second type control signal and the third type control signal are not generated over a third time period when the on-screen display menu is displayed by the electronic device.

20. The method of claim 15, further comprising:

turning off the electronic device if the second type control signal is generated when the electronic device is turned on.

* * * * *